US012695825B2

(12) United States Patent
Li et al.

(10) Patent No.: US 12,695,825 B2
(45) Date of Patent: Jul. 28, 2026

(54) ELECTRONIC DEVICE

(71) Applicant: VIVO MOBILE COMMUNICATION CO., LTD., Guangdong (CN)

(72) Inventors: Siming Li, Guangdong (CN); Xujun Mao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 302 days.

(21) Appl. No.: 18/516,795

(22) Filed: Nov. 21, 2023

(65) Prior Publication Data

US 2024/0089358 A1 Mar. 14, 2024

Related U.S. Application Data

(63) Continuation of application No. PCT/CN2022/097120, filed on Jun. 6, 2022.

(30) Foreign Application Priority Data

Jun. 9, 2021 (CN) .......................... 202110643246.0

(51) Int. Cl.
*H04M 1/03* (2006.01)
*H04M 1/02* (2006.01)

(52) U.S. Cl.
CPC ......... *H04M 1/035* (2013.01); *H04M 1/0266* (2013.01); *H04M 1/0277* (2013.01)

(58) Field of Classification Search
CPC ... H04M 1/035; H04M 1/0266; H04M 1/0277

(Continued)

(56) References Cited

U.S. PATENT DOCUMENTS

| | | | | | |
|---|---|---|---|---|---|
| 10,499,132 | B1 * | 12/2019 | Gao | .......................... | H04R 7/16 |
| 2004/0102208 | A1 * | 5/2004 | Nuovo | .................... | H04M 1/23 |
| | | | | | 455/575.8 |

(Continued)

FOREIGN PATENT DOCUMENTS

| | | |
|---|---|---|
| CN | 201947325 U | 8/2011 |
| CN | 202679442 U | 1/2013 |

(Continued)

OTHER PUBLICATIONS

First Office Action for Chinese Application No. 202110643246.0, dated Nov. 1, 2022, 8 Pages.

(Continued)

*Primary Examiner* — April G Gonzales
(74) *Attorney, Agent, or Firm* — BROOKS KUSHMAN P.C.

(57) ABSTRACT

An electronic device, which relates to the field of terminal technologies, and includes a housing, a support, a mainboard, a loudspeaker module, and a first sealing member, where the mainboard is disposed on the housing, the support is disposed on the mainboard, a groove is provided on a side of the support close to the mainboard, at least part of the loudspeaker module is disposed between the support and the housing, a first side wall of the loudspeaker module, the support, the mainboard, and the housing enclose and form a first sound cavity of the loudspeaker module, the first sound cavity includes at least part of the groove, and at least part of the first sealing member is located between the support and the mainboard.

9 Claims, 14 Drawing Sheets

(58) Field of Classification Search
USPC ........................................................ 455/550.1
See application file for complete search history.

(56) References Cited

U.S. PATENT DOCUMENTS

| | | | | |
|---|---|---|---|---|
| 2010/0039253 | A1* | 2/2010 | Zang | G08B 25/009 |
| | | | | 340/539.1 |
| 2012/0020508 | A1* | 1/2012 | Wang | H04M 1/035 |
| | | | | 381/332 |
| 2014/0177902 | A1* | 6/2014 | Yeh | H04R 1/227 |
| | | | | 381/394 |
| 2015/0072723 | A1* | 3/2015 | Schoffmann | H04M 1/035 |
| | | | | 381/346 |
| 2016/0295316 | A1* | 10/2016 | Shao | H04R 1/2826 |
| 2016/0323675 | A1* | 11/2016 | Dai | H04R 31/006 |
| 2019/0007534 | A1* | 1/2019 | Hu | H04M 1/724092 |
| 2020/0084528 | A1* | 3/2020 | Jeong | H01M 50/209 |
| 2020/0329309 | A1* | 10/2020 | Lu | H02J 7/70 |
| 2021/0144458 | A1* | 5/2021 | Zhang | H04R 1/02 |
| 2023/0239386 | A1* | 7/2023 | Zheng | H04R 1/2888 |
| | | | | 361/679.01 |

FOREIGN PATENT DOCUMENTS

| | | | |
|---|---|---|---|
| CN | 208489973 | U | 2/2019 |
| CN | 111245987 | A | 6/2020 |
| CN | 112003970 | A | 11/2020 |
| CN | 211860199 | U | 11/2020 |
| CN | 112261186 | A | 1/2021 |
| CN | 112769988 | A | 5/2021 |
| CN | 112788166 | A | 5/2021 |
| CN | 113382099 | A | 9/2021 |
| KR | 20200030237 | A | 3/2020 |
| WO | 2021042403 | A1 | 3/2021 |

OTHER PUBLICATIONS

International Search Report and Written Opinion for Application No. PCT /CN2022/097120, dated Aug. 26, 2022, 9 Pages.

* cited by examiner

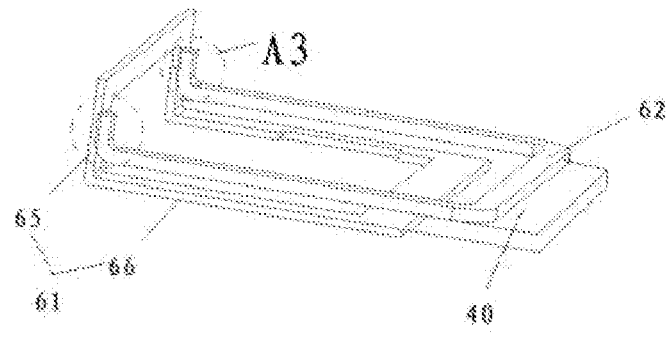
FIG. 1
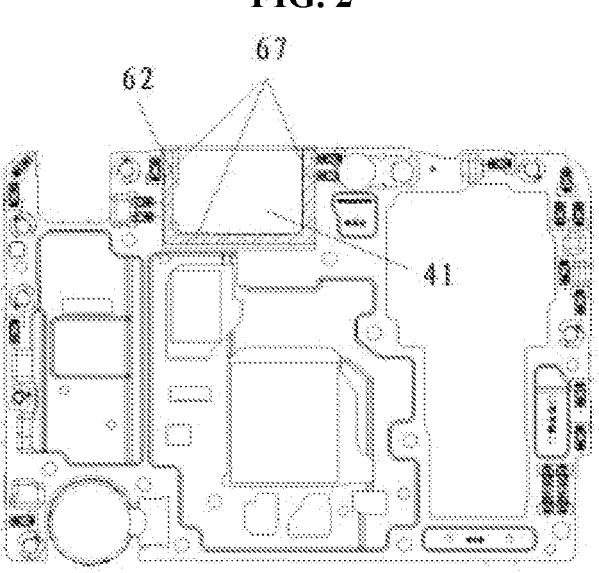
FIG. 2
FIG. 3

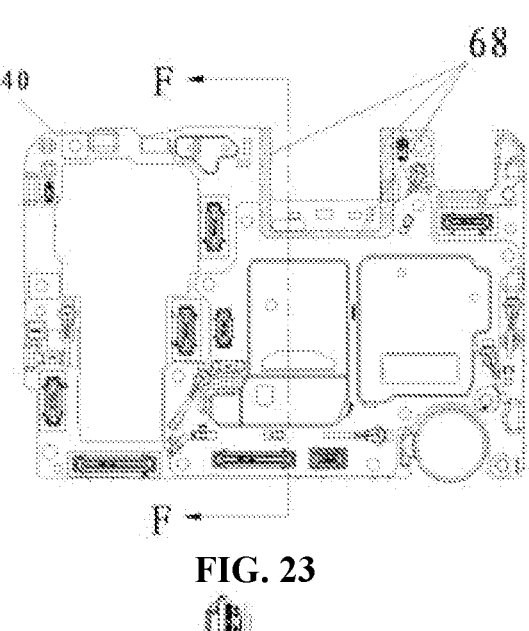
FIG. 23
FIG. 24
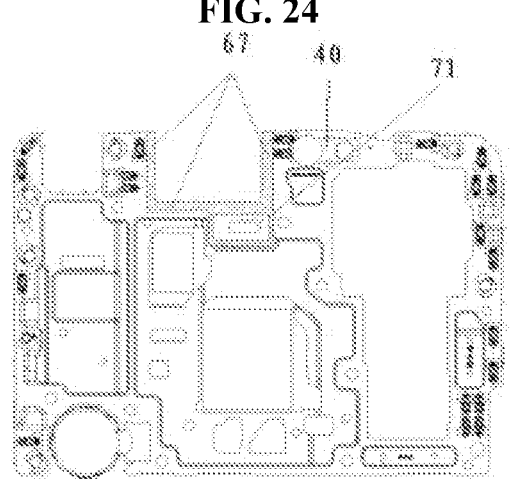
FIG. 25

ELECTRONIC DEVICE

CROSS-REFERENCE TO RELATED APPLICATIONS

This application is a continuation of PCT International Application No. PCT/CN2022/097120 filed on Jun. 6, 2022, which claims priority to Chinese Patent Application No. 202110643246.0 filed on Jun. 9, 2021, which are incorporated herein by reference in their entireties.

TECHNICAL FIELD

This application relates to the field of terminal technologies, and specifically, to an electronic device.

BACKGROUND

A mobile phone is used as an indispensable call and multimedia tool for people. With the continuous development of the mobile phone, people put forward a higher requirement on sound volume and sound effect of the mobile phone. By using dual speakers located at the top and bottom of a phone body, the sound volume and a stereo sound effect of the mobile phone can be improved. When the top speaker of the mobile phone does not have a good airtight sound cavity, the top and bottom speakers work, airflow from the speakers violently impact a battery cover or housing, a user feels a strong sense of vibration when holding the mobile phone, and a hand is numb if the mobile phone is used for a long time, which seriously affect user experience.

SUMMARY

An embodiment of this application provides an electronic device, including:

a housing, a support, a mainboard, a loudspeaker module, and a first sealing member, where
the mainboard is disposed on the housing, the support is disposed on the mainboard, a groove is provided on a side of the support close to the mainboard, at least part of the loudspeaker module is disposed between the support and the housing, a first side wall of the loudspeaker module, the support, the mainboard, and the housing enclose and form a first sound cavity of the loudspeaker module, the first sound cavity includes at least part of the groove, and at least part of the first sealing member is located between the support and the mainboard.

Optionally, the electronic device further includes:
a display module, where a through groove is provided on and runs through the housing, a second side wall of the loudspeaker module is located at an opening of one end of the through groove, the display module covers part of an opening of the other end of the through groove, the display module, the housing, and the second side wall of the loudspeaker module enclose and form a second sound cavity having a sound emitting hole.

Optionally, the second side wall of the loudspeaker module blocks the opening of the end of the through groove.

A second sealing member is disposed between the second side wall of the loudspeaker module and the housing, and the second sealing member extends around an edge of the opening of the end of the through groove.

Optionally, the electronic device further includes:
a third sealing member, where one end of the third sealing member is located between the housing and the support, and the other end of the third sealing member is located between the mainboard and the housing.

Optionally, an avoiding hole is provided on the mainboard, at least part of the loudspeaker module is placed in the avoiding hole, the third sealing member includes a first sealing body and a second sealing body, the first sealing body is located between the housing and the support, the second sealing body extends around an edge of the avoiding hole, and the second sealing body is located between the mainboard and the housing.

Optionally, the first sealing member extends around the avoiding hole, and at least part of the first sealing member abuts against the third sealing member.

Optionally, at least part of the first sealing member is located between the third sealing member and the support.

Optionally, a cavity with a side opening is provided on a side of the housing facing the mainboard, and the first sound cavity is in communication with the cavity.

Optionally, a channel is provided on the mainboard, and the channel is in communication with the cavity and the first sound cavity.

Optionally, a fourth sealing member is disposed between an edge of an opening of the cavity and the mainboard.

Optionally, the electronic device further includes:
a cover plate, where the cover plate and the housing enclose and form an accommodating cavity, and the loudspeaker module and the mainboard are located in the accommodating cavity.

BRIEF DESCRIPTION OF THE DRAWINGS

FIG. 1 is a schematic diagram in which a third sealing member, a first sealing member, and a mainboard cooperate with each other;

FIG. 2 is a schematic diagram in which a third sealing member cooperates with a mainboard;

FIG. 3 is a schematic diagram in which a first sealing member cooperates with a mainboard;

FIG. 23 is a schematic structural diagram of a mainboard;

FIG. 24 is a sectional view at a line F-F in FIG. 23;

FIG. 25 is another schematic structural diagram of a mainboard;

Figure 4:
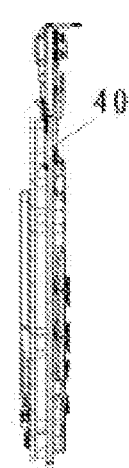
FIG. 4 is a schematic structural diagram of a mainboard.
Figure 5:
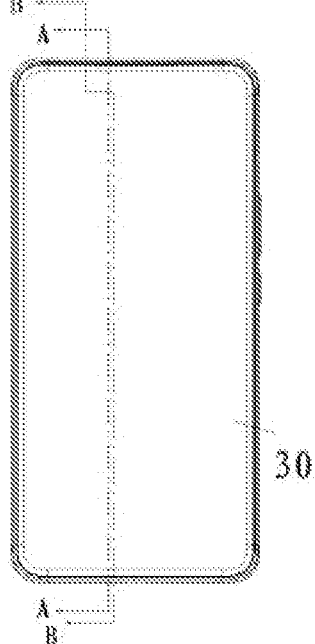
FIG. 5 is a schematic diagram of a display module on an electronic device.
Figure 6:
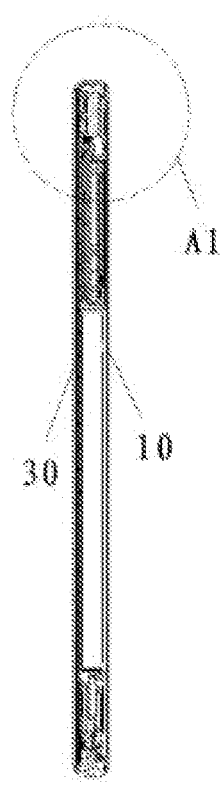
FIG. 6 is a sectional view at a line A-A in FIG. 5.

REFERENCE SIGNS housing 10; cavity 11; loudspeaker module 20; second side wall 21; first side wall 22; second sound cavity 23; first sound cavity 24; display module 30; first retaining ring 31; second retaining ring 32; sound emitting hole 33; mainboard 40; avoiding hole 41; support 50; protruding portion 51;

first sealing member 62; second sealing member 63; third sealing member 61; fourth sealing member 64;

first sealing body 65; second sealing body 66; first sealing region 67; second sealing region 68; third sealing region 69; cover plate 70; and channel 71.

DETAILED DESCRIPTION

The following clearly describes the technical solutions in the embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application without creative efforts shall fall within the protection scope of this application.

In the specification and claims of this application, the terms "first", "second", and the like are used to distinguish similar objects, but are not used to describe a specific sequence or order. It may be understood that the data used in such a way is interchangeable in proper circumstances, so that the embodiments of this application can be implemented in other sequences than the sequence illustrated or described herein. In addition, "and/or" in this specification and the claims represents at least one of the connected objects, and a character "I" used herein generally indicates an "or" relationship between associated objects.

An electronic device according to the embodiments of this application is described in detail below with reference to the accompanying drawings, FIG. 1 to FIG. 31, through specific embodiments and application scenarios thereof.

As shown in FIG. 1 to FIG. 31, the electronic device in the embodiments of this application includes: a housing 10, a support 50, a mainboard 40, a loudspeaker module 20, and a first sealing member 62, where the mainboard 40 is disposed on the housing 10, the support 50 is disposed on the mainboard 40, the support 50 may be connected to the housing 10, a groove may be provided on a side of the support 50 close to the mainboard 40, at least part of the loudspeaker module 20 is disposed between the support 50 and the housing 10, and the loudspeaker module 20 may be connected to the housing 10. A first side wall 22 of the loudspeaker module 20, the support 50, the mainboard 40, and the housing 10 may enclose and form a first sound cavity 24 of the loudspeaker module 20, the first sound cavity 24 may be an airtight sound cavity, a sound emitted by the loudspeaker module 20 may vibrate in the first sound cavity 24, the first sound cavity 24 may include at least part of the groove, at least part of the first sealing member 62 is located between the support 50 and the mainboard 40, and a gap between the support 50 and the mainboard 40 may be sealed by using the first sealing member 62, thereby improving tightness of the first sound cavity 24. A side of the support 50 close to the mainboard 40 may have a protruding portion 51 protruding toward the mainboard 40, the protruding portion 51 may abut against the mainboard 40, the groove may be enclosed and formed by using the protruding portion 51, the first side wall 22 of the loudspeaker module 20, the support 50, the mainboard 40, and the housing 10 may enclose and form the first sound cavity 24 of the loudspeaker module 20, and additionally, at least part of the groove may form the first sound cavity 24.

In the electronic device in this application, the first sound cavity 24 is enclosed and formed by using the first side wall 22 of the loudspeaker module, the support 50, the mainboard 40, and the housing 10, the first sound cavity 24 includes the at least part of the groove, and the at least part of the first sealing member 62 is located between the support 50 and the mainboard 40. By using the first sealing member 62, tightness of the first sound cavity 24 may be better, and a sound of the loudspeaker module 20 vibrates inside the first sound cavity 24, so that a sense of vibration is first transferred to the mainboard 40 and the support 50, vibration of a battery cover may be reduced, an area of the mainboard may be reduced with a minimal limit, arrangement of components on the mainboard is not affected, a sense of vibration obtained when the loudspeaker module emits a sound is reduced, and use experience of a user is improved.

Figure 8:
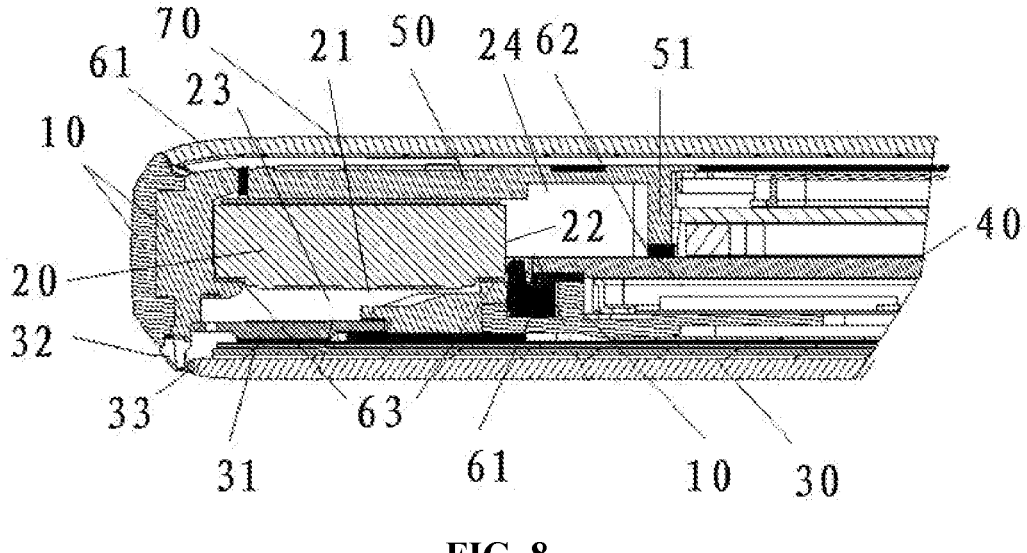
FIG. 8 is a schematic amplified view of a portion A1 in FIG. 6.
Figure 9:
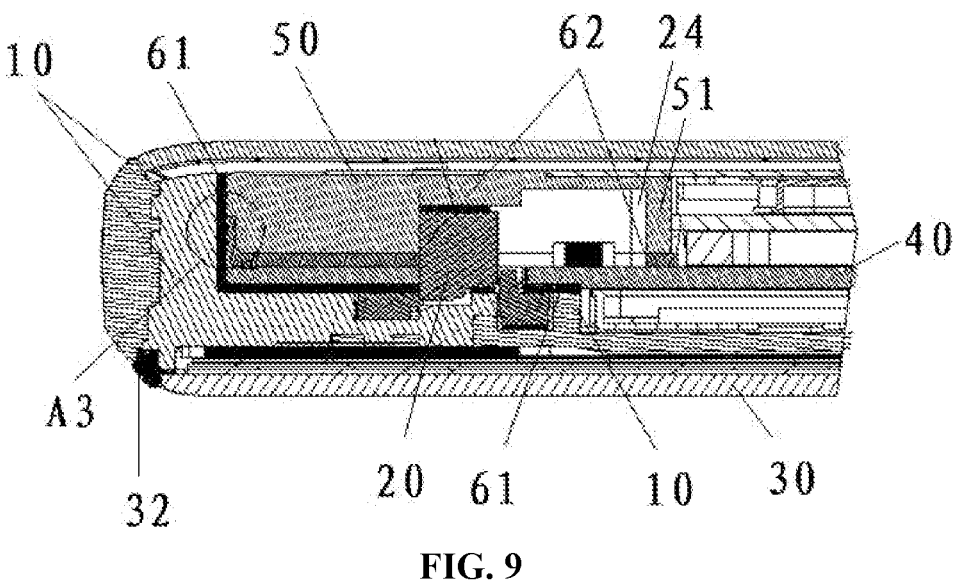
FIG. 9 is a schematic amplified view of a portion A2 in FIG. 7.

In some embodiments, as shown in FIG. 8 and FIG. 9, the electronic device may further include a display module 30. The mainboard 40 may be disposed on a side of the housing 10 away from the display module 30, and the support 50 may be disposed on a side of the mainboard 40 away from the display module 30. A through groove may be provided on and runs through the housing 10, the through groove may run through the housing along a thickness direction of the housing 10, a second side wall 21 of the loudspeaker module 20 may be located at an opening of one end of the through groove, and the second side wall 21 of the loudspeaker module 20 may block or partially block the opening of the end of the through groove. The display module 30 may cover part of an opening of the other end of the through groove, so that a sound emitted by the loudspeaker module 20 may come out through an unblocked part of the opening of the other end of the through groove. The display module 30, the housing 10, and the second side wall 21 of the loudspeaker module 20 may enclose and form a second sound cavity 23 having a sound emitting hole 33, so that the sound emitted by the loudspeaker module 20 comes out from the sound emitting hole 33 after vibrating in the second sound cavity 23.

In some embodiments, the second side wall 21 of the loudspeaker module 20 may block the opening of the end of the through groove, so that a sound emitted from the second sound cavity 23 cannot be transmitted from the opening of the end of the through groove, and the sound vibrates in the second sound cavity 23 and is transmitted from the sound emitting hole 33.

In some other embodiments, as shown in FIG. 8, a second sealing member 63 may be disposed between the second side wall 21 of the loudspeaker module 20 and the housing 10. The second sealing member 63 may be an adhesive layer for ease of connection and sealing, the second sealing member 63 may extend around an edge of the opening of the end of the through groove, and tightness between the second side wall 21 of the loudspeaker module 20 and the housing 10 may be improved by using the second sealing member 63, thereby avoiding the sound being transmitted from a gap.

Optionally, as shown in FIG. 8 and FIG. 9, a first retaining ring 31 may be disposed on a side of the display module 30 facing the loudspeaker module 20, the first retaining ring 31 may be located at the other end of the through groove and may cover the loudspeaker module 20, and a first through hole may be provided on the first retaining ring 31 for ease of sound transmission.

Optionally, a second retaining ring 32 may be disposed at a position on the housing 10 close to the first retaining ring 31, a gap between the housing 10 and the display module 30 may be reduced by using the second retaining ring 32, and the second retaining ring 32 may be separated from the display module 30 to form the sound emitting hole 33 for ease of sound transmission. The second retaining ring 32 may be disposed at a position on an edge of the housing 10 close to the first retaining ring 31, the second retaining ring 32 may be separated from an edge of the display module 30 to form the sound emitting hole 33, a size and specific position of the sound emitting hole 33 may be reasonably selected according to the actual situation, and the size and a shape of the sound emitting hole 33 may be adjusted by adjusting a shape and size of the second retaining ring 32. The loudspeaker module 20 may be a loudspeaker, and by using a double-sided adhesive on the loudspeaker and a double-sided adhesive on a receiver, the second sound cavity 23 may separately seal retaining rings of the loudspeaker and the receiver.

In some embodiments, the electronic device may further include a third sealing member 61. One end of the third sealing member 61 is located between the housing 10 and the support 50, and the other end of the third sealing member 61 is located between the mainboard 40 and the housing 10. Sealing members may be disposed among the support 50, the mainboard 40, and the housing 10, where one end of the third sealing member 61 may be located between the housing 10 and the support 50 to implement sealing between the housing 10 and the support 50, the other end of the third sealing member 61 may be located between the mainboard 40 and the housing 10 to implement sealing between the mainboard 40 and the housing 10, the at least part of the first sealing member 62 may be located between the support 50 and the mainboard 40, and the gap between the support 50 and the mainboard 40 may be sealed by using the first sealing member 62. By using the sealing members, gaps among the support 50, the mainboard 40, and the housing 10 may be reduced, a sound transmitted from the gaps may be reduced, and vibration of the electronic device due to the sound may be reduced. The third sealing member 61 and the first sealing member 62 each may be a foam or rubber sealing layer. For ease of sealing arrangement, an adhesive layer may be disposed on a surface of each of the third sealing member 61 and the first sealing member 62, and the adhesive layer may be a sealing adhesive layer or may be a waterproof adhesive layer. Sealing and connection with another structure is implemented by using the adhesive layer, which is simple and convenient, and may also improve sealing effect.

In this embodiment of this application, as shown in FIG. 1 to FIG. 30, an avoiding hole 41 may be provided on the mainboard 40, at least part of the loudspeaker module 20 may be placed in the avoiding hole 41 for ease of disposing the loudspeaker module 20 by using the avoiding hole 41. The third sealing member 61 may include a first sealing body 65 and a second sealing body 66, the first sealing body 65 may be located between the housing 10 and the support 50, and a gap between the housing 10 and the support 50 may be sealed by using the first sealing body 65. The second sealing body 66 may extend around an edge of the avoiding hole 41, a first sealing region 67 may be disposed around the edge of the avoiding hole 41 on a side surface of the mainboard 40 close to the housing 10, the second sealing body 66 may be disposed in the first sealing region 67, the second sealing body 66 may be located between the mainboard 40 and the housing 10, and a gap between the mainboard 40 and the housing 10 may be sealed by using the second sealing body 66, thereby improving tightness of the first sound cavity 24 and reducing device vibration due to sound vibration.

In some embodiments, the first sealing body 65 and the second sealing body 66 each may be of a U shape, one end of the first sealing body 65 is connected to one end of the second sealing body 66, the other end of the first sealing body 65 is connected to the other end of the second sealing body 66, the first sealing body 65 and the second sealing body 66 may be integrally formed, which enhances integrity and is conducive to enhancing sealing effect.

Optionally, two ends of the first sealing body 65 may be perpendicular to the mainboard 40, and the two ends of the first sealing body 65 may be perpendicularly connected to the second sealing body 66 for ease of cooperation between the sealing body and another structure.

In some embodiments, the first sealing member 62 may extend around the avoiding hole 41, and at least part of the first sealing member 62 may abut against the third sealing member 61, thereby enhancing sealing effect between the first sealing member 62 and the third sealing member 61. A second sealing region 68 may be disposed around the edge of the avoiding hole 41 on a side surface of the mainboard 40 away from the housing 10, and a part of the first sealing member 62 may be disposed in the second sealing region 68.

Optionally, as shown in FIG. 1 and FIG. 9, at least part of the first sealing member 62 may be located between the third sealing member 61 and the support 50, the at least part of the first sealing member 62 may overlap and cooperate with the third sealing member 61, and the overlapping may be shown in FIG. 1 and a portion A3 in FIG. 9, thereby enhancing sealing effect among the first sealing member 62, the third sealing member 61, and the support 50.

Figure 27:
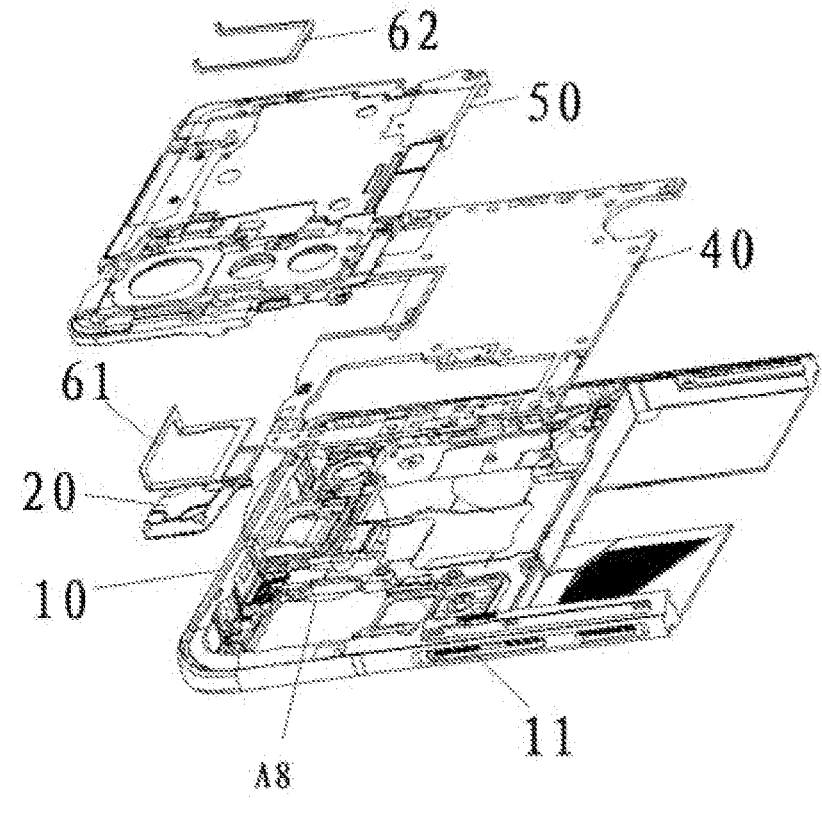
FIG. 27 is another exploded schematic view of an electronic device.
Figure 28:
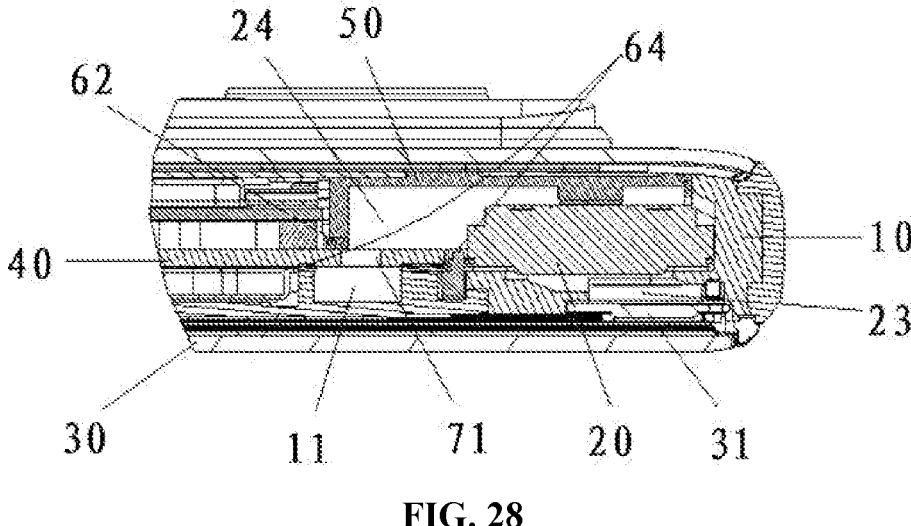
FIG. 28 is a schematic amplified view of a portion A7 in FIG. 26.

As shown in FIG. 27 and FIG. 28, in this embodiment of this application, a cavity 11 with a side opening may be provided on a side of the housing 10 facing the mainboard 40, a surrounding rib may be provided on the side of the housing 10 facing the mainboard 40, the cavity 11 may be enclosed and formed by using the surrounding rib, the cavity 11 may be of a cuboid shape, the first sound cavity 24 is in communication with the cavity 11, the first sound cavity 24 may be in communication with the cavity 11 through an opening of the cavity 11, and the opening of the cavity 11 may face the first sound cavity 24 for ease of communication between the first sound cavity 24 and the cavity 11, increasing a volume of the sound cavity, and improving sound effect.

In some embodiments, as shown in FIG. 28, a channel 71 may be provided on the mainboard 40, the channel 71 is in communication with the cavity 11 and the first sound cavity 24, and the channel 71 may be in communication with the opening of the cavity 11, thereby being connected to the cavity 11 through the opening of the cavity 11. The channel 71 may be a hole of a runway shape, a size of the hole may be 4.6 mm*1.6 mm, and a size and shape of the channel may be determined based on stacking of the mainboard and audio debug.

Figures 29, 30, 31:
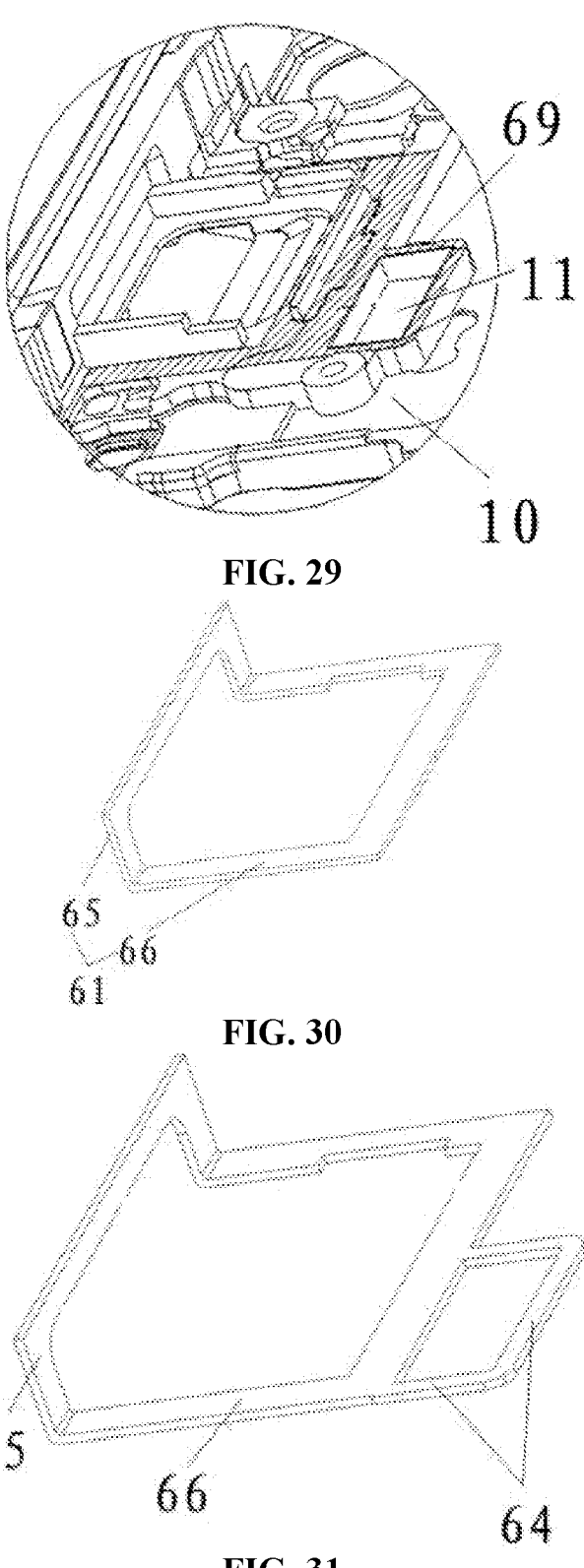
FIG. 29 is a schematic amplified view of a portion A8 in FIG. 27.
FIG. 30 is a schematic structural diagram of a third sealing member.
FIG. 31 is a schematic structural diagram in which a third sealing member is connected to a fourth sealing member.

In some other embodiments, as shown in FIG. 28, a fourth sealing member 64 may be disposed between an edge of the opening of the cavity 11 and the mainboard 40. As shown in FIG. 29, a third sealing region 69 may be disposed on the edge of the opening of the cavity 11, the fourth sealing member 64 may be disposed in the third sealing region 69, and a gap between the edge of the opening of the cavity 11 and the mainboard 40 may be sealed by using the fourth sealing member 64, thereby enhancing tightness of the cavity 11, so that a cavity formed after the first sound cavity 24 is in communication with the cavity 11 has better tightness. The fourth sealing member 64 and the third sealing member 61 may be connected together or may be integrally formed. The fourth sealing member 64 may be of a U shape, two ends of the fourth sealing member 64 may be connected to the second sealing body 66, and the fourth sealing member 64 and the second sealing body 66 may be located on a same plane.

Figure 7:
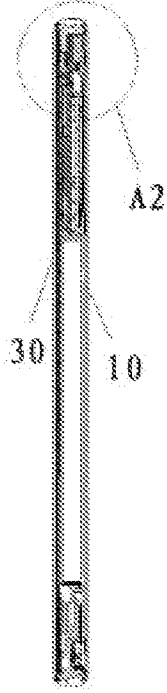
FIG. 7 is a sectional view at a line B-B in FIG. 5.

A sound cavity volume of the first sound cavity 24 of the loudspeaker module 20 may be increased by using the cavity 11. As shown in FIG. 7, components may be arranged inside and outside the third sealing region 69, and arrangement is forbidden in the sealing region, so that a space of the mainboard can be effectively used. The surrounding rib is added in the housing 10, the surrounding rib may be provided on the side of the housing 10 facing the mainboard 40, the cavity 11 may be enclosed and formed by using the surrounding rib, and the surrounding rib may correspond to the sealing region on the mainboard 40.

Figures 10, 11:
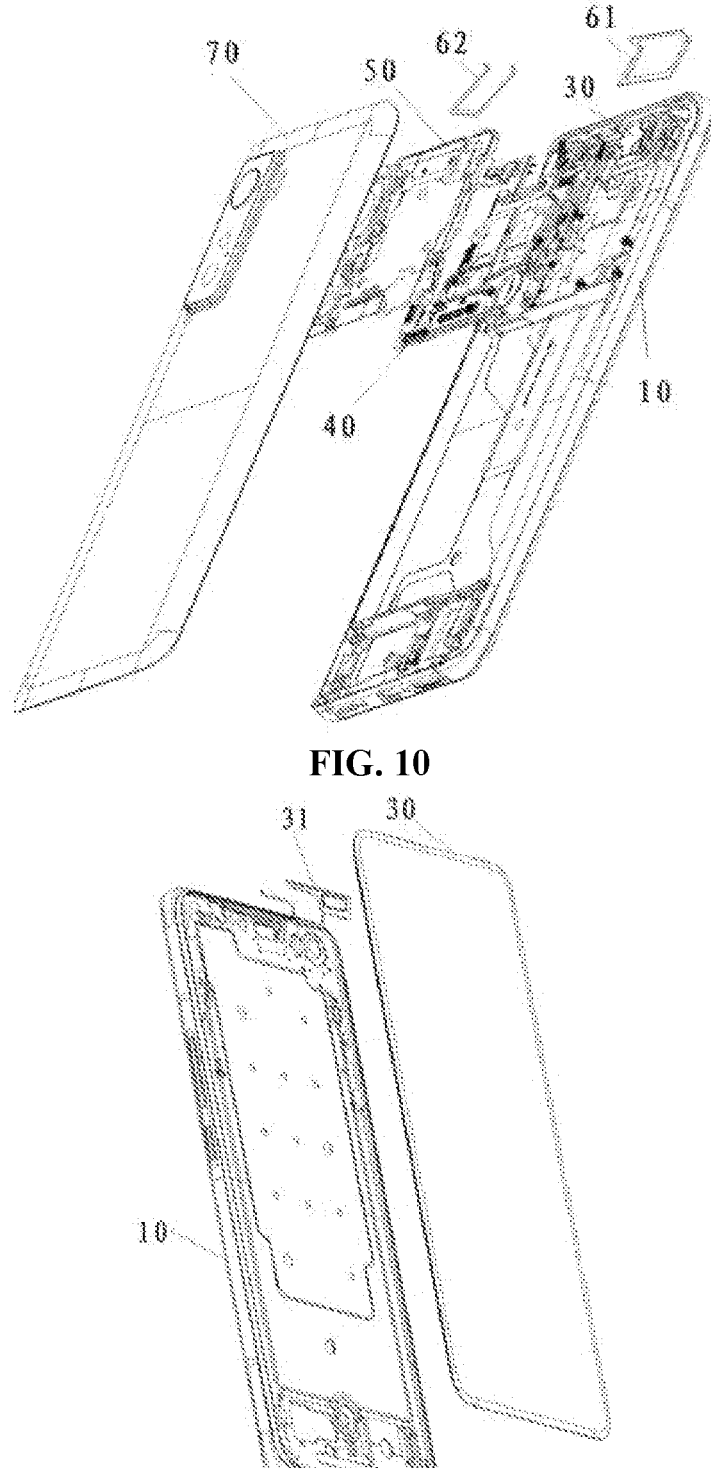
FIG. 10 is an exploded schematic view of an electronic device.
FIG. 11 is another exploded schematic view of an electronic device.
Figure 12:
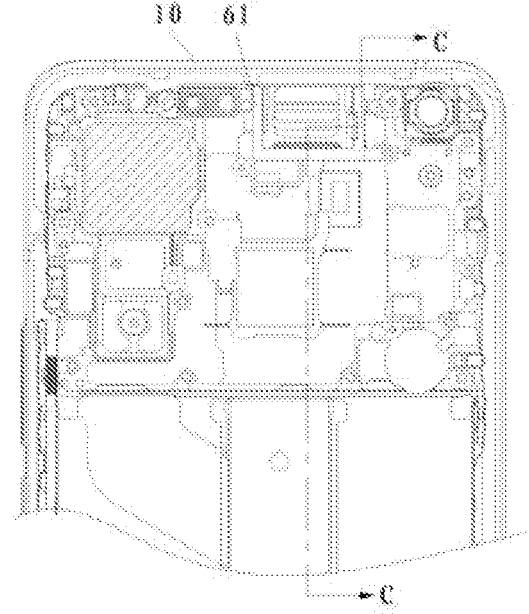
FIG. 12 is a schematic diagram in which a third sealing member cooperates with a housing.
Figure 13:
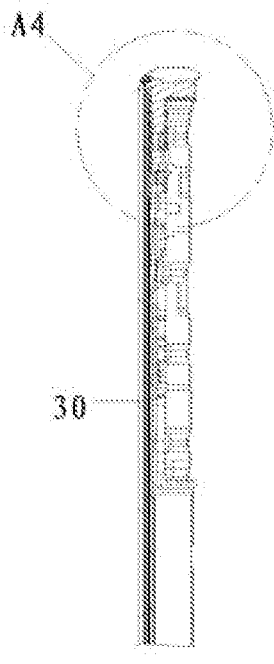
FIG. 13 is a sectional view at a line C-C in FIG. 12.
Figure 14:
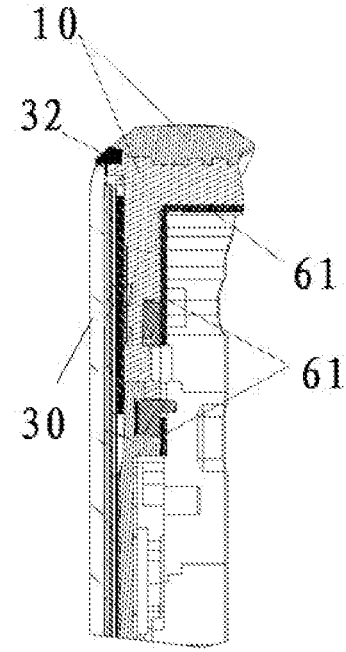
FIG. 14 is a schematic amplified view of a portion A4 in FIG. 13.
Figure 15:
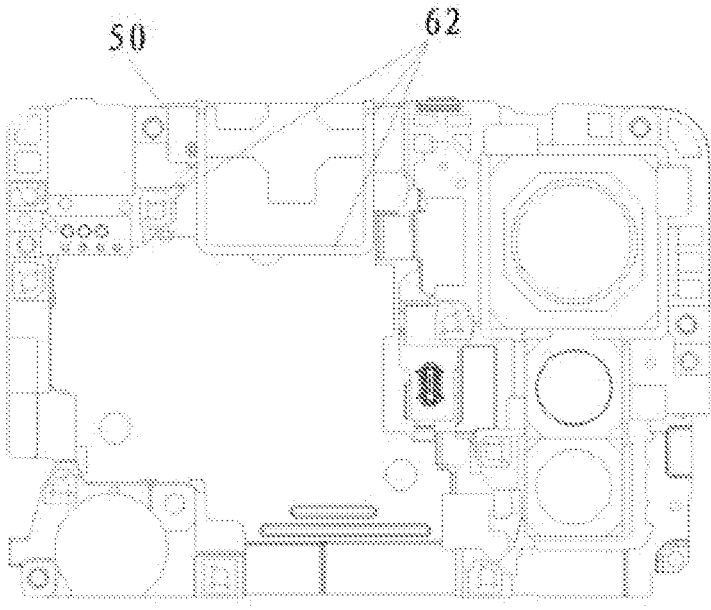
FIG. 15 is a schematic diagram in which a first sealing member cooperates with a support.
Figure 16:
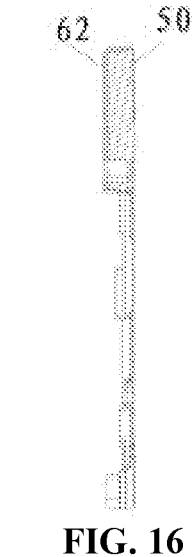
FIG. 16 is a sectional view in which a first sealing member cooperates with a support.
Figure 17:
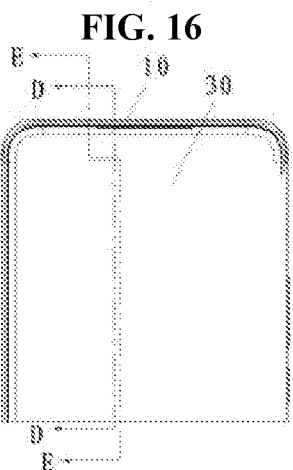
FIG. 17 is a local schematic view of an electronic device.
Figure 18:
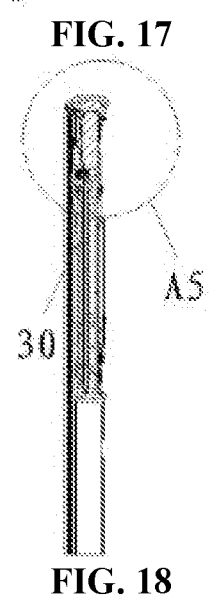
FIG. 18 is a sectional view at a line D-D in FIG. 17.
Figure 19:
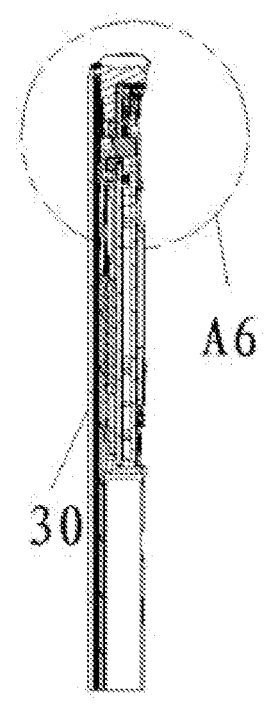
FIG. 19 is a sectional view at a line E-E in FIG. 17.
Figure 20:
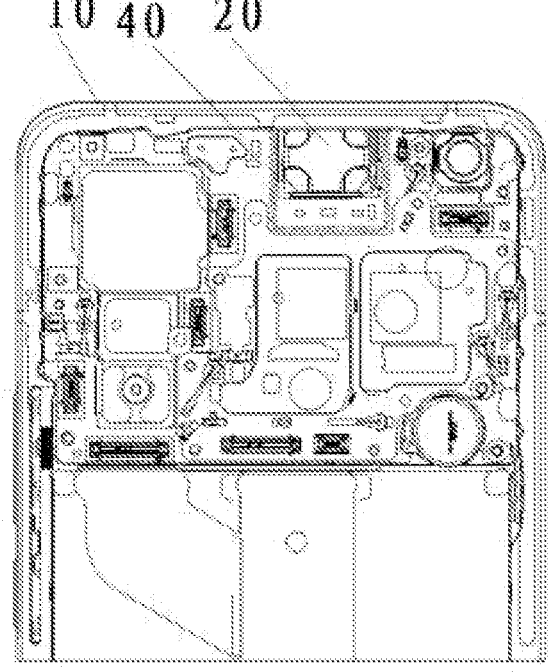
FIG. 20 is a schematic diagram in which a loudspeaker module cooperates with a mainboard.
Figure 21:
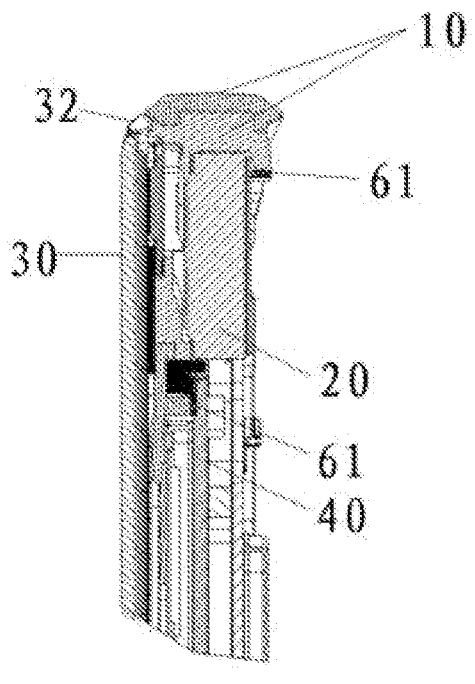
FIG. 21 is a schematic amplified view of a portion A5 in FIG. 18.
Figure 22:
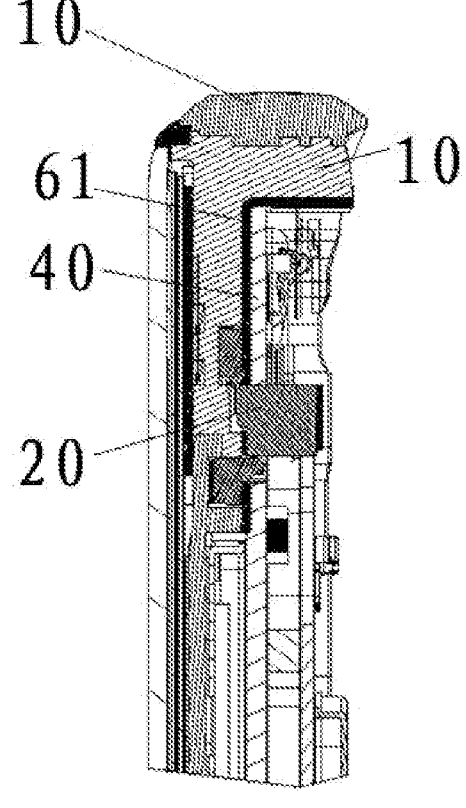
FIG. 22 is a schematic amplified view of a portion A6 in FIG. 19.
Figure 26:
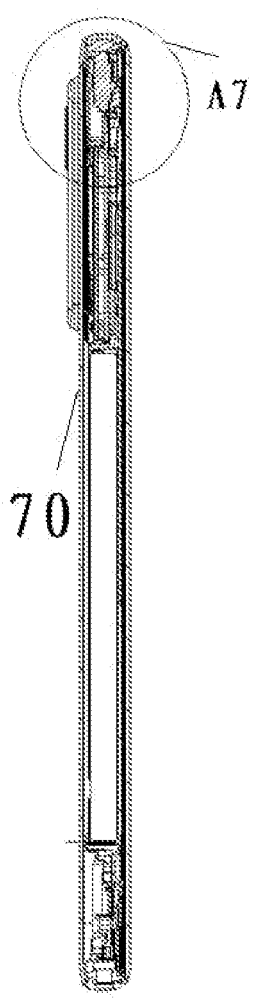
FIG. 26 is a sectional view on an electronic device.

In some embodiments, as shown in FIG. 8 and FIG. 10, the electronic device may further include a cover plate 70. The cover plate 70 and the housing 10 enclose and form an accommodating cavity, the loudspeaker module 20 and the mainboard 40 may be located in the accommodating cavity, the support 50 may be located in the accommodating cavity, and the accommodating cavity may protect the loudspeaker module 20 and the mainboard 40.

In the embodiments of this application, as shown in FIG. 8 and FIG. 10, the electronic device may further include the cover plate 70. The cover plate 70 is disposed on a side of the support 50 away from the mainboard 40, and the cover plate 70 may be used as a battery cover and may cover and protect the support 50 and the mainboard 40.

In an assembly process, the loudspeaker module 20 is first assembled in the housing 10 of the electronic device, the third sealing member 61 is then attached to a sealing surrounding rib and side wall corresponding to the housing 10, the first sealing member 62 may be attached to the support 50 in advance; the mainboard 40 and the support 50 with the first sealing member 62 are assembled in the housing 10 of the electronic device, and screws are locked.

In an application process, the third sealing member may be of a "mouth" (of a Chinese character) shape with adhesive on a single side and may be laminated with backing adhesive and foam, where the adhesive faces the housing 10, sealing a lower surface of the mainboard 40 and the housing 10, and a space may be reserved for sealing between a side wall of the housing 10 and the support 50. The first sealing member may be of a U shape with adhesive on two sides and may be laminated with backing adhesive, sound cavity foam, and backing adhesive. Sealing is mainly performed among the lower surface of the mainboard 40, the support 50, and the side wall of the housing 10. A specific implementation may be that the first sealing member is attached to the support 50 in advance, and forms an L shape, which may be divided into a plane sealing part and a bending sealing part of the sealing member. A sealing region corresponding to a U shape rib may be reserved on a surface of the mainboard 40 considering arrangement, and a width of the rib may be 0.8 mm to 1 mm, for sealing of the plane sealing part of the sealing member. The bending sealing part of the sealing member may be configured to seal a side wall of the support 50 and the side wall of the housing 10, and overlap and seal with the third sealing member attached to a side wall region of the housing 10.

The embodiments of this application are described above with reference to the accompanying drawings, but this application is not limited to the foregoing specific embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. An electronic device, comprising:
a housing, a support, a mainboard, a loudspeaker module, and a first sealing member, wherein
the mainboard is disposed on the housing, the support is disposed on the mainboard, a part of a surface of the support facing the mainboard is recessed in a direction away from the mainboard to form a groove, at least part of the loudspeaker module is disposed between the support and the housing, a first side wall of the loudspeaker module, the support, the mainboard, and the housing enclose and form a first sound cavity of the loudspeaker module, at least part of the groove forms a part of the first sound cavity, and at least part of the first sealing member is located between the support and the mainboard;
wherein the electronic device further comprises:
a display module, wherein a through groove is provided on and runs through the housing, a second side wall of the loudspeaker module is located at an opening of one end of the through groove, the display module covers part of an opening of the other end of the through groove, the display module, the housing, and the second side wall of the loudspeaker module enclose and form a second sound cavity having a sound emitting hole.

2. The electronic device according to claim 1, wherein the second side wall of the loudspeaker module blocks the opening of the end of the through groove.

3. The electronic device according to claim 1, wherein a second sealing member is disposed between the second side wall of the loudspeaker module and the housing, and the second sealing member extends around an edge of the opening of the end of the through groove.

4. The electronic device according to claim 1, further comprising:

a third sealing member, wherein one end of the third sealing member is located between the housing and the support, and the other end of the third sealing member is located between the mainboard and the housing.

5. The electronic device according to claim 4, wherein an avoiding hole is provided on the mainboard, at least part of the loudspeaker module is placed in the avoiding hole, the third sealing member comprises a first sealing body and a second sealing body, the first sealing body is located between the housing and the support, the second sealing body extends around an edge of the avoiding hole, and the second sealing body is located between the mainboard and the housing.

6. The electronic device according to claim 5, wherein the first sealing member extends around the avoiding hole, and at least part of the first sealing member abuts against the third sealing member.

7. The electronic device according to claim 4, wherein at least part of the first sealing member is located between the third sealing member and the support.

8. The electronic device according to claim 1, wherein a cavity with a side opening is provided on a side of the housing facing the mainboard, and the first sound cavity is in communication with the cavity.

9. The electronic device according to claim 1, further comprising:

a cover plate, wherein the cover plate and the housing enclose and form an accommodating cavity, and the loudspeaker module and the mainboard are located in the accommodating cavity.

\* \* \* \* \*